Sept. 15, 1959  KENJI SHIMOMURA  2,904,019
ROTARY INTERNAL COMBUSTION ENGINE
Filed March 22, 1957                                    4 Sheets-Sheet 1

KENJI SHIMOMURA
INVENTOR.

BY Wenderoth, Lind & Ponack
Attys

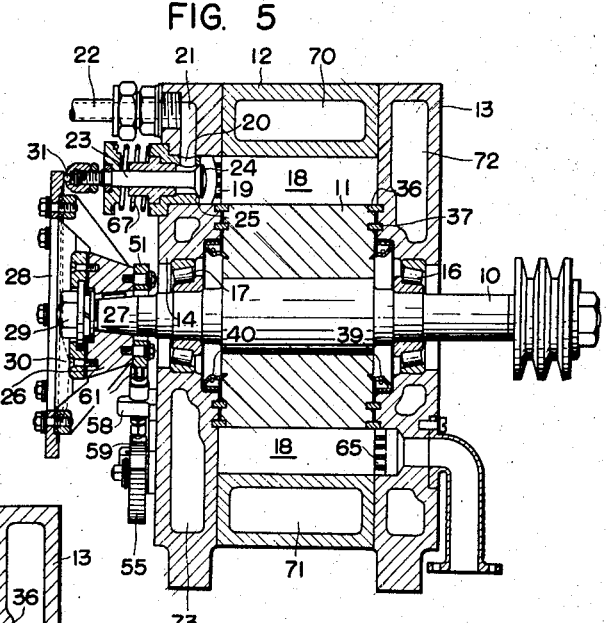

Sept. 15, 1959  KENJI SHIMOMURA  2,904,019
ROTARY INTERNAL COMBUSTION ENGINE
Filed March 22, 1957  4 Sheets-Sheet 4

KENJI SHIMOMURA
*INVENTOR.*

BY
Wenderoth, Lind & Ponack
*Attys*

United States Patent Office 2,904,019
Patented Sept. 15, 1959

2,904,019

ROTARY INTERNAL COMBUSTION ENGINE

Kenji Shimomura, Kyoto, Japan

Application March 22, 1957, Serial No. 648,460

Claims priority, application Japan March 31, 1956

1 Claim. (Cl. 123—15)

The present invention relates to a rotary internal combustion engine.

The rotary engine according to the present invention is provided with a cylindrical stator and a rotor rotating coaxially with and within said stator, said rotor being supported by end wall members enclosing both open ends of said stator. The clearance between the inside surface of the stator and the outside surface of the rotor is enclosed by said end wall members to form an annular closed chamber which is to be a combustion chamber. This combustion chamber is divided by a plurality of blades or ridges provided to project radially on the surface of the rotor into as many combustion chambers. Said blades extend axially from one end to the other on the surface of the rotor. Both side walls of each blade are to slide gas-tightly on the respective inside surfaces of the end wall plates. The outer end surface of each blade is also to slide gas-tightly on the inside surface of the stator or cylinder.

Rotary shutters supported rotatably by the end walls and extending from one end to the other on the inside surface of the cylinder parallelly with the axis of said cylinder and rotor are inserted in the combustion chambers formed between said cylinder and rotor. Said rotary shutters which are one more than the aforementioned blades of the rotor are provided at equal intervals to receive the combustion gas pressure produced in the combustion chamber. A rotary swing motion will be given to each of said rotary shutters by the action of a cam attached to the shaft of the rotor and a cam follower so that the rotary shutter may move from the position of the contact of its lower surface with the outside peripheral surface of the rotor to the position of the immersion thereof into a recess formed on the inside surface of the cylindrical stator or cylinder.

In said stationary cylinder, between the adjacent rotary shutters, an inlet port for a fuel gas mixture is formed close to one of said rotary shutters and an exhaust outlet port for the combustion gas is formed close to the other. A valve operated by the shaft of the rotor is set in each of said ports.

In the rotary engine according to the present invention, a fuel gas put under pressure outside the engine will be sucked through the inlet port into the combustion chamber formed between the blade planted on the rotor and the rotary shutter located behind said blade and will be ignited by the firing device of an electric sparking plug exposed in said chamber, the blade of the rotor will be pushed by the high pressure gas due to said explosion, the motion will be transmitted to the rotor, the rotor will thus rotate and power will be generated.

In the rotary engine according to the present invention, as described above, the cylindrical clearance between the rotor and cylinder is divided into several combustion chambers in each of which the rotor will be rotated by the combustion of the gas. Therefore, a plurality of combustions of the gas will be obtained during one revolution of the rotor. Thus an engine of a high output per unit weight with a small bulk can be obtained.

A main object of the present invention is to provide a rotary internal combustion engine wherein a plurality of combustion chambers are provided between a rotor and a cylinder located outside said rotor so that the rotor may be rotated by the combustion of a gas mixture under pressure sucked into each combustion chamber.

Another object of the present invention is to provide a rotary internal combustion engine wherein a plurality of combustions of the fuel or generations of the energy will occur during one revolution of the rotor.

The features and advantages of the present invention will be made clear by the following explanation with reference to the drawings.

Fig. 5 is a sectioned view on line 5—5 in Figs. 2, 3 and 4.

Fig. 6 is a sectioned view on line 6—6 in Figs. 2, 3 and 4, the cam mechanism, controlling mechanism and other parts to be mounted on the end wall members being omitted.

Figure 1:
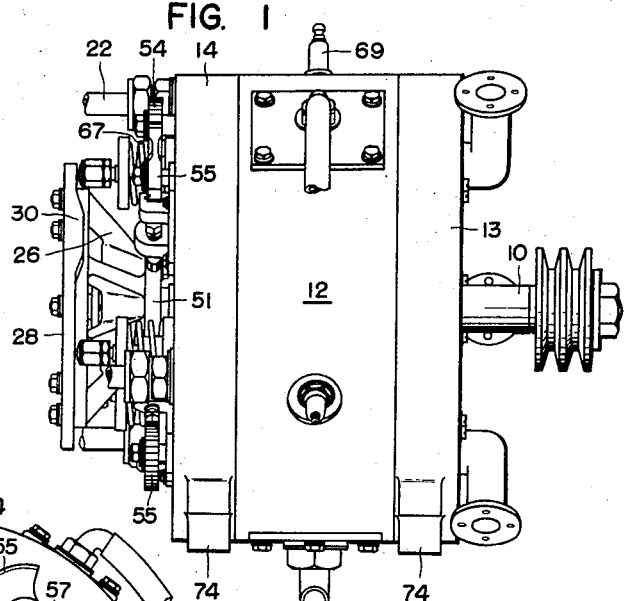
Fig. 1 is an elevation of the rotary internal combustion engine, with the cooling water pipes, exhaust pipe, fuel inlet pipe, etc. partly removed.

The rotary internal combustion engine according to the present invention is provided with a rotor 11 fitted and fixed to a driving shaft 10 and a cylinder 12 disposed outside said rotor 11. Respective end wall members 13 and 14 are fixed to both sides of the cylinder 12 by mounting means 15 consisting of bolts and nuts. The wall members 13 and 14 are provided with roller bearings 16 and 17, respectively, to bear the driving shaft 10. The annular clearance 18 between the outside peripheral surface of said rotor 11 and the inside cylindrical surface of said cylinder 12 forms combustion chambers to generate the energy.

Three fuel inlet ports 19 are formed at regular angular intervals on the end wall member 14 so as to correspond to said combustion chambers. (See Figs. 4 and 5). Each of these fuel inlet ports consists of an assembly of many small holes for the reason to be made clear in the later description herein. In the end wall member 14, opposite said inlet 19 is formed a valve chamber 20 which communicates with a passage 21 formed in said member 14. (See Fig. 5.) A fuel feeding pipe 22 fixed to the outside of the member 14 communicates with said passage 21. (See Figs. 2 and 5.) The valve head 24 of a valve 23 thrust in from the outside of the end wall member 14 is located in said valve chamber 20 so as to abut on a valve seat 25, the surfaces of such abutment being conical.

A spider 26 to support a cam plate 28 is secured to that part 27 of the driving shaft 10 projecting out of the end wall member 14 by means of a nut 29 engaging with the outer end of said part 27. (See Figs. 1 and 5.) On the inner surface of said cam plate 28 is formed a cam lobe 30 which will inwardly push each valve 23 in turn through a ball 31 fitted at the outward projecting end of said valve 23 when the shaft 10 rotates. When the valve 23 is thus pushed inward, the valve head 24 will separate from the valve seat 25 and a fuel gas mixture under pressure will come into the combustion chamber 18 through the pipe 22 and passage 21.

The rotor 11 is provided with two blades 32 and 33 projecting in the diametrically opposed positions on its outside surface in this particular embodiment and in parallel with its longitudinal axis. The distance between both end surfaces of the rotor and blades is substantially equal to the width of the cylinder 12. Said end surfaces are very close to the respective end wall members 13 and 14. Such sealing members as are represented by 35, 36 and 37 are inserted in each of said end surfaces. The top surfaces of the blades 32 and 33 are in sliding relation with the inside surface of the cylinder 12. In each of said top surfaces are inserted sealing bars 38 arranged at an angle to the axis of the rotor. The combustion chamber or the annular clearance 18 will be divided into two combustion chambers by said two blades 32 and 33. Oil seals 39 and 40 are fitted in the inside walls of the end wall members 13 and 14, respectively, so as to surround the shaft 10. Their sealing lips 41 and 42 engage with the respective end surfaces of the rotor 11 so as to seal the lubricating oil in these parts.

Figure 4:
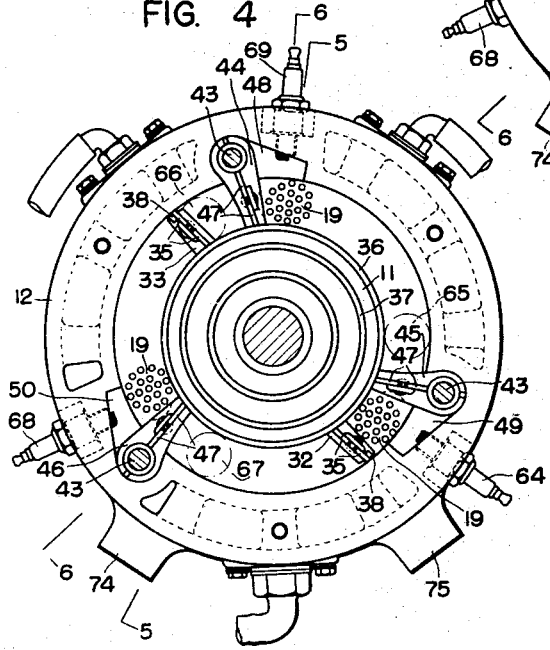
Fig. 4 is a side view showing the ends of the rotor and cylinder and other internal structures, the end wall member shown in Fig. 3 being removed.
Figure 7:
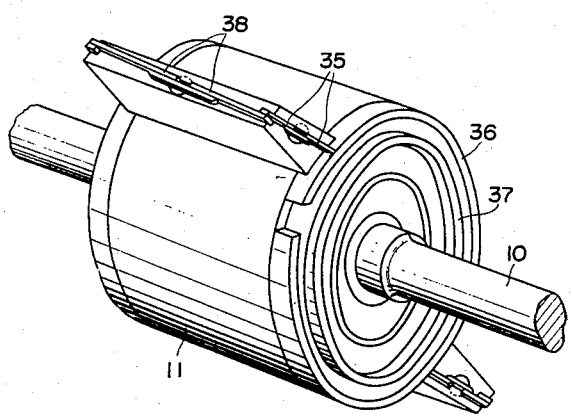
Fig. 7 is a perspective view showing only the rotor.

As clearly illustrated in Figs. 4 and 6, the cylinder 12 is provided with three rotary shutters 44, 45 and 46 which are fixed to respective operation rods 43 passing through from one end wall member 13 to the other end wall member 14 and which project in the annular clearance 18. Said three shutters 44, 45 and 46 are arranged at regular angular intervals and close to and just behind the respective fuel inlet ports 19. The width of each of said shutters is substantially equal to the distance between the respective inside walls of both end wall members 13 and 14. Therefore, a sealing member 47 is provided in each of both end surfaces of each rotary shutter. When the respective operation rods 43 rotate, said rotary shutters will submerge into respective recesses 48, 49 and 50 formed in the inside surface of the cylinder 12. The outside surface of each rotary shutter is so formed as to make exactly the same curved surface as the cylindrical inside surface of the cylinder when the rotary shutter has thus rotated and submerged into the recess in the inside surface of the cylinder 12.

Figure 2:
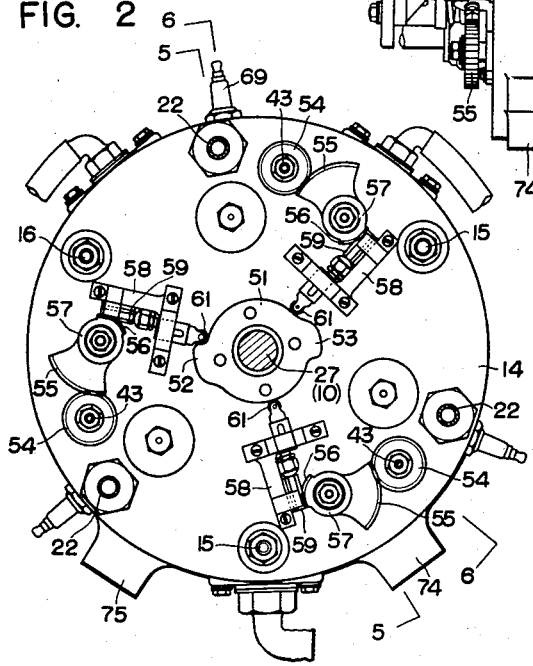
Fig. 2 is a side view of the engine shown in Fig. 1 and shows the end wall member provided with a cam mechanism to control the fuel inlet valves and a cam and gear mechanism to control the rotary shutters or is an end view of said engine on one side, the first mentioned controlling cam mechanism being omitted.
Figure 3:
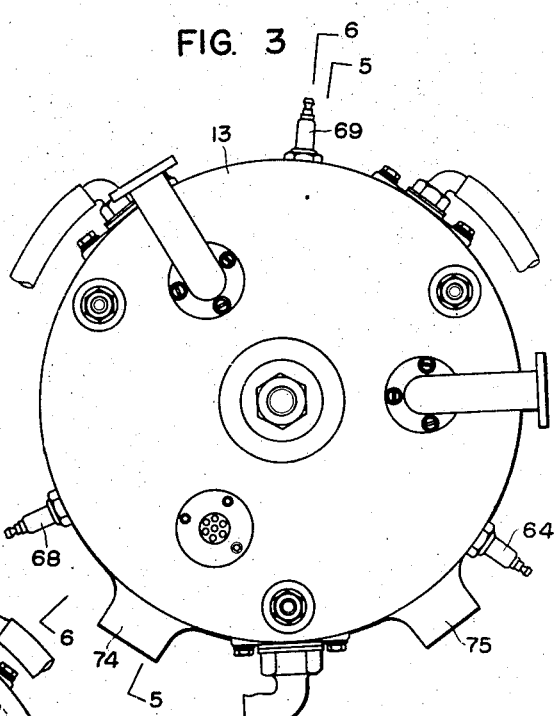
Fig. 3 is an elevation of the other end wall member fixed to the other side of the cylinder inserted between it and the one shown in Fig. 2 or is an end view of the engine on the other side.

As shown in Fig. 2, at the back of the aforementioned spider block 26, a cam 51 is fixed to that part 27 of the shaft projecting out of the end wall member or end plate 14. Two cam lobes 52 and 53 are formed in diametrically opposite positions on the outer periphery of the cam 51. A pinion 54 is fixed to that part of each of the aforementioned operating rods 43 projecting out of the end wall member 14. A gear 57 on which are formed two arcuate gears 55 and 56 of different radii is set on the end wall member 14 so as to engage with each pinion 54. The gear 56 is engaged with a rack 59 slidably supported on a supporting member 58 fixed to the end wall member 14. Said rack 59 is to be operated by a slider 60 which is slidably supported on the supporting member 58 so as to be operated by the cam 51. Therefore, when the cam 51 fixed to the shaft 10 is rotated by the rotation of said shaft, the gear 54 will be rotated through the rack 59 and gears 56 and 55 by the movement of a cam follower 61 in contact with said cam 51 by the cam lobes 52 and 53 and the rod 43 will be rotated by the reciprocating movement of said gear 54. Such movement will occur in each shutter. The shutters 44, 45 and 46 will rotate in turn with the angular movement of the cam lobes and will reciprocally rotate in a range from the state shown in Fig. 4 to a state wherein they are in the respective recesses 48, 49 and 50 to allow the passage of the blades 32 and 33. The timing of the operation of each shutter is such that, when the blade has approached the shutter due to the rotation of the rotor, the rotation for fitting the shutter into the recess in the inside wall of the cylinder will occur, that, when the shutter has completely submerged into the recess, the blade will slide and pass thereon and that, as soon as the passage of the blade is over, the shutter will return to the original position. It is, therefore, needless to say that the cam lobes formed on the cam should be set so as to synchronize with the travel of the blade.

Fig. 4 shows a state wherein the blade 32 has passed the rotary shutter 45 and said shutter has returned to the original position. In this state, the blade 32 has just passed the inlet port 19 and an air-gasoline gas mixture under such pressure as, for example, 2 to 3 atmospheres is being pressed into the combustion chamber. As the blade will thus move by rubbing the inside wall of the combustion chamber, in order to prevent the combustion gas sealing members 62 and 63 shown in Fig. 6 from catching or dropping into the opening edge of the inlet port, each of the inlet ports and exhaust ports is formed of many small holes. When the blade 32 has further rotated clockwise, a sparking plug 64 fixed to the cylinder 12 so that its electric arc electrodes may project from the upper wall of the recess 49 will ignite, the gas mixture will explosively burn, the gas pressure thus caused will push the blade 32 clockwise and a torque will be generated on the shaft 10.

In Fig. 4, the other blade 33 is on the exhaust outlet port 66 formed of many small holes in the end wall member 13 and is thus in the final stage of the exhaust stroke. In this explanation, the three exhaust ports 65, 66 and 67 are shown in chain lines in Fig. 4 and are formed in these shown positions in the end wall member 13. (See Fig. 5.)

The above mentioned action of the rotation of the engine according to the present invention presupposes that the rotor is already rotating. However, the engine may be started either by a starting motor or by compressed air to be switched over to the fuel gas mixture when sufficient inertia has been obtained.

The blade 32 operated as described above by the combustion of the fuel gas mixture will transmit rotation to the shaft 10 by its movement. In such case, as mentioned above, the rotary shutter 45 will be in the illustrated position and its lower end surface will be in airtight contact with the peripheral surface of the rotor 11. The axis of each shutter is inclined in the direction of the progress of the blade at a slight angle to the line connecting the center of rotation of the shutter and that of the rotor or the diameter of the rotor passing through the center of rotation of the shutter in order to minimize the leakage of the combustion gas through the contact surfaces of the blade and rotor.

When the blade 32 has passed the fuel inlet port 19 shown close to said blade and is in a predetermined position or at the end of the operation of the suction of the fuel, the inlet valve 20 will descend from the lobe 30 of the cam plate 28, will abut on and engage with the valve seat 25 due to the action of a spring 67 (Fig. 5) and will thus check the entry of the fuel and prevent the escape of the combustion gas. As the blade 32 travels due to the expansion of the combustion gas, it will push out through the exhaust outlet port 67 the expanded combustion gas which has acted on the preceding blade 33. Such supply, combustion, expansion and exhaustion of the fuel gas mixture are effected in turn by the rotation of the rotor. When the blade 32 is at the end of the operation of completing the exhausting action or at the end of the expansion, said blade 32 will approach the rotary shutter 46. As this time, as described above, the follower 61 will mount on the lobe 53 of the cam 52, the shutter 46 will rotate and will fit into the recess 50 and the blade 32 will pass on the shutter and further on the fuel inlet port 19 adjacent to said shutter. It is as described above that, as the blade thus proceeds past the fuel inlet port, the fuel will be fed into the chamber, then the sparking plug 68 will operate and the combustion of the fuel will occur.

At the same time as the blade 32 is operating as described above, the other blade 33 will also operate in the same manner and will thus travel clockwise from the position shown in Fig. 4, the rotary shutter 44 will fit into the recess 48, the fuel will be fed in through the fuel inlet port 19 adjacent to the shutter 44, then the sparking plug 69 will ignite and said fuel will cause combustion. The above mentioned operation will be continuously repeated. In the illustrated embodiment, the kinetic energy will be given to each of the blades 32 and 33 three times during the period of one revolution of the rotor.

It is the most important feature of the present invention that the energy for rotation will be given to the rotor six times in all during one revolution of the rotor as described above. There has never been such rotary engine as this wherein the energy is thus generated six times during the period of one revolution. This number of times of generation of the energy can be increased by increasing the number of the blades. It is however natural that the number should be determined so as to be most efficient in consideration of the capacity of the combustion chamber and the expansion speed of the fuel.

The same ignition system including electric discharge sparking plugs for burning the fuel pressed into the combustion chamber as is used in the conventional reciprocating engine can also be used in the present invention. Therefore, the distributor, electric system, etc. shall not be explained herein. The rotary engine according to the present invention will generate a large amount of heat the same as any other combustion engine does. It is therefore needless to say that cooling is necessary. Thus, passages for such cooling medium as, for example, water are provided in the cylinder and both end wall members. They are partly represented by 71 to 73 in the drawings. However, such cooling is not any of the essential features of the present invention and shall not be detailed herein.

In the present engine the fuel gas mixture is introduced under pressure into the combustion chamber, in which case the pressurization of the fuel gas mixture may be carried out by another machine, for example, such as electric motors, conventional internal combustion engines, etc., however, it is more suitable that a turbo-charger for air is connected with the driving shaft of this engine. The air for combustion is compressed by said turbo-charger and then introduced into the combustion chamber between the rotor and stator.

The engine according to the present invention is useful for any of land, marine and vehicle uses. However, illustrated in the drawings attached hereto is a stationary engine which is a type used in general. It will be mounted on a proper base member by means of supporting lugs 74 and 75. (See Fig. 4.)

I claim:

A rotary internal combustion engine comprising a rotor having an elongated cylindrical shape, a driving shaft on which said rotor is mounted, a stationary cylinder in which said rotor is coaxially mounted, end wall members secured to the ends of said cylinder and in which said shaft is rotatably supported, said rotor, said cylinder and said end wall members defining an annular chamber of rectangular cross-section, a plurality of rectangular blades having straight top and side faces, and mounted on said rotor projecting substantially radially outwardly therefrom, said blades being spaced at equal distances around the circumference of said rotor, sealing bars on the top and side faces, respectively, of each of said blades, said sealing bars slidably engaging the cylindrical inner surface of said cylinder and inner surfaces of said end wall members, respectively, in gas-tight relation, said sealing bars on said top faces being skew with respect to the axis of said shaft, a plurality of shutters of rectangular shape, said plurality being one more in number than said plurality of blades, pivotally mounted on said cylinder and spaced at equal distances around the circumference of said chamber, means actuated from said shaft for moving said shutters in sequential order between a position in which said shutters project into said annular chamber in gas-tight sliding contact with the inner surfaces of said end wall members and the outer peripheral surface of said rotor and another position in which said shutters are retracted out of said chamber, said cylinder having recesses wherein for accommodating said shutters in the retracted positions, each of said shutters having one side surface of arcuate shape to form a portion of the cylindrical inner surface of said cylinder when in the retracted position, one of said end wall members having a plurality of fuel inlet ports therein, one at a position adjacent each of said shutters on the leading side of the shutter in the direction of rotation of said rotor, and the other of said end members having a plurality of exhaust outlet ports therein, one at a position adjacent each of said shutters on the side opposite to said inlet port therewith.

References Cited in the file of this patent

UNITED STATES PATENTS

| 968,630 | Zimmer | Aug. 30, 1910 |
| 1,366,919 | Marvin | Feb. 1, 1921 |
| 1,629,580 | Lithander | May 24, 1927 |
| 2,235,118 | Ripke | Mar. 18, 1941 |

FOREIGN PATENTS

| 17,820 | Great Britain | Dec. 17, 1908 |
| 541,874 | Great Britain | Dec. 16, 1941 |
| 545,606 | Great Britain | June 4, 1942 |
| 660,163 | France | Feb. 12, 1929 |